United States Patent
Chandross et al.

(10) Patent No.: US 6,936,196 B2
(45) Date of Patent: Aug. 30, 2005

(54) SOLIDIFIABLE TUNABLE LIQUID MICROLENS

(75) Inventors: Edwin A. Chandross, Murray, NJ (US); Timofei N. Kroupenkine, Warren, NJ (US); Shu Yang, North Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/096,199

(22) Filed: Mar. 12, 2002

(65) Prior Publication Data

US 2003/0227100 A1 Dec. 11, 2003

(51) Int. Cl.$^7$ .............................................. B29D 11/00
(52) U.S. Cl. ..................... 264/1.36; 359/665; 425/174.4
(58) Field of Search ................................ 264/1.1, 1.36, 264/1.7, 484; 425/174.4, 808; 359/665

(56) References Cited

U.S. PATENT DOCUMENTS

| | | | | |
|---|---|---|---|---|
| 3,454,686 | A | * | 7/1969 | Jones .......................... 264/1.36 |
| 3,670,130 | A | | 6/1972 | Greenwood ................. 200/183 |
| 4,030,813 | A | | 6/1977 | Kohashi et al. ........... 350/161 S |
| 4,569,575 | A | | 2/1986 | Le Pesant et al. .......... 350/355 |
| 5,486,337 | A | | 1/1996 | Ohkawa ...................... 422/100 |
| 5,659,330 | A | | 8/1997 | Sheridon ...................... 345/84 |
| 6,014,259 | A | | 1/2000 | Wohlstadter |
| 6,369,954 | B1 | | 4/2002 | Berge et al. ................. 359/666 |
| 6,538,823 | B2 | * | 3/2003 | Kroupenkine et al. ...... 359/665 |
| 6,545,815 | B2 | * | 4/2003 | Kroupenkine et al. ...... 359/665 |
| 6,545,816 | B1 | | 4/2003 | Kroupenkine et al. ...... 359/665 |

FOREIGN PATENT DOCUMENTS

| | | | |
|---|---|---|---|
| DE | 196 23 270 A1 | 1/1998 | ........... G02B/26/09 |
| FR | 2 769 375 A1 | 4/1999 | ............ G02B/3/14 |
| FR | WO 99/18456 | 4/1999 | ........... G02B/26/02 |

OTHER PUBLICATIONS

"Electrostatically Actuation of Liquid Droplets for Microreactor Application," by Masao Washizu, IEEE Transactions on Industry Applications, vol. 34, No. 4, Jul./Aug. 1998, pp. 732–737.

"Surface Profiles of Reflow Microlenses Under the Influence of Surface Tension and Gravity," by Andreas Schilling Andreas et al., Opt. Eng.39(8) pp. 2171–2176, Society of Photo–Optical Instrumentation Engineers, Aug. 2000.

"Variable Focal Length Microlenses," by L.G. Commander et al., Optice Communications 177, Apr. 15, 2000,pp. 157–170.

"Potential–Dependent Wetting of Aqueous Solutions on Self–Assembled Monolayers Formed from 15–(Ferrocenylcarbonyl) pentadecanethiol on Gold," by Nicholas L. Abbott and George M. Whitesides, American Chemical Society, Langmuir, vol. 10, No. 5, 1994, pp. 1493–1497.

* cited by examiner

Primary Examiner—Mathieu D. Vargot

(57) ABSTRACT

A microlens of the present invention may include a liquid droplet whose position and/or surface curvature may be changed (tuned), e.g., by selectively biasing one or more electrodes configured to said droplet. The droplet may then be solidified to fix a desired configuration (e.g., focal length) of the microlens. In one embodiment, the droplet has an optically curable liquid adhesive that is polymerized under exposure to UV light. Microlenses of the present invention may be used, for example, in optical devices to obtain and then maintain optimal coupling between various optical components.

20 Claims, 5 Drawing Sheets

SOLIDIFIABLE TUNABLE LIQUID MICROLENS

CROSS REFERENCE TO RELATED APPLICATIONS

The subject matter of this application is related to that of (i) U.S. patent application Ser. No. 09/884,605, filed Jun. 19, 2001, and entitled "Tunable Liquid Microlens" and (ii) U.S. patent application Ser. No. 09/951,637, filed Sep. 13, 2001, and entitled "Tunable Liquid Microlens with Lubrication Assisted Electrowetting," both of which are incorporated herein by reference.

BACKGROUND OF THE INVENTION

1. Field of the Invention

The present invention relates to optics, and more particularly to microlenses.

2. Description of the Related Art

Several approaches may be used for implementing a tunable microlens. For example, one known approach is to control the refractive index of a lens using an electrostatic potential applied to that lens. Such lenses are typically referred to as gradient index (GRIN) lenses. The range of tunability (e.g., of the focal length) for GRIN lenses is governed primarily by the electro-optic coefficient of the lens material. Unfortunately, electro-optic coefficients associated with the typical materials used in GRIN lenses are relatively small. This fact results in small optical path modulation and, therefore, necessitates the use of relatively thick lenses and/or high electrostatic potentials. In addition, many electro-optic materials display strong birefringence causing the properties of a GRIN lens to be polarization dependent.

Another approach for implementing a tunable microlens is to mechanically control the shape of the microlens using flexible elastic materials, such as transparent polymers, for making the lens. A typical mechanically adjustable, flexible lens has a wider range of tunability than a GRIN lens. However for operation, mechanically adjustable lenses require external actuation devices, such as mechanical pumps, that may be laborious and expensive to implement. For example, integrating actuation devices into a two-dimensional array of tunable microlenses is particularly difficult.

Yet another approach for implementing a tunable microlens is disclosed in U.S. Pat. No. 6,014,259 to Wohlstadter, issued Jan. 11, 2000, the teachings of which are incorporated herein by reference. Wohlstadter teaches a variable-focus liquid lens controlled through self-assembled monolayers (SAMS) adsorbed on a substrate. However, one problem with such lenses is the limited choice of complementary materials that can be used for a SAM/substrate combination. Another problem is a strong hysteresis typically exhibited by SAM-controlled lenses. The hysteresis may result, for example, in failure of a lens to return to the original shape when the tuning voltage is disconnected. Furthermore, none of the above-described microlenses, including GRIN and mechanically adjustable lenses, allow for simultaneous lens position adjustment and focal length tuning.

SUMMARY OF THE INVENTION

U.S. patent application Ser. No. 09/884,605, filed Jun. 19, 2001, and entitled "Tunable Liquid Microlens," describes a tunable liquid microlens that may include a liquid droplet whose position and/or surface curvature may be changed, e.g., by selectively biasing one or more electrodes configured to said droplet. U.S. patent application Ser. No. 09/951,637, filed Sep. 13, 2001, and entitled "Tunable Liquid Microlens with Lubrication Assisted Electrowetting," describes a method of tuning a tunable microlens using a lubrication layer. The present invention provides further improvements of the tunable microlens and methods of tuning and making the same disclosed in those patent applications.

The present invention provide a solidifiable tunable liquid microlens. A microlens of the present invention may include a liquid droplet whose position and/or surface curvature may be changed, i.e., tuned, e.g., by selectively biasing one or more electrodes configured to said droplet. The droplet may then be solidified to fix a desired configuration, e.g., focal length and position, of the microlens. Solidification may be induced or may occur through the passage of time. In one embodiment, the droplet comprises an optically curable liquid adhesive that is polymerized under exposure to UV light. Microlenses of the present invention may be used, for example, in optical devices to obtain and then maintain optimal coupling between various optical components.

According to one embodiment of the present invention, a lens may be made by: (A) tuning a droplet including a solidifiable liquid on a substrate to a desired configuration; and (B) at least partially solidifying the liquid.

According to another embodiment of the present invention, a microlens includes: (a) a substrate; (b) an at least partially solidified droplet disposed on the substrate; (c) at least one electrode configured to the substrate; and (d) at least one electrode configured to the droplet.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Liquid Microlenses and the Electrowetting Phenomenon

Before embodiments of the present invention are described in detail, a brief general description of liquid microlenses and the electrowetting phenomenon is provided.

Figure 1:
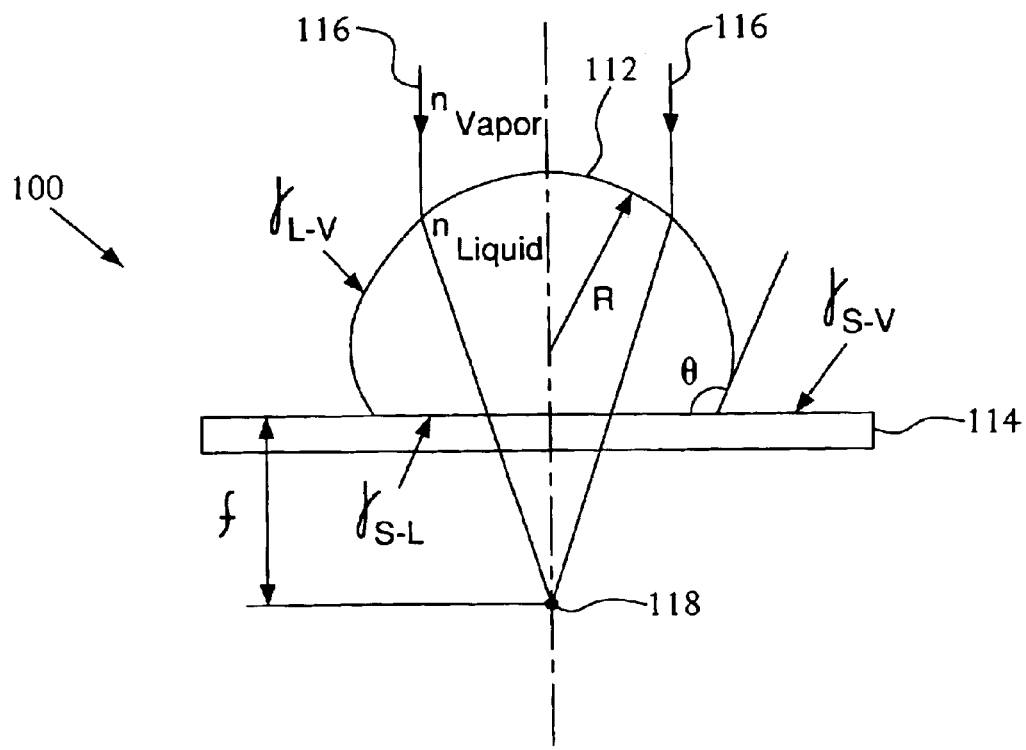
FIG. 1 illustrates various parameters characterizing a liquid microlens.

FIG. 1 shows a liquid microlens 100, comprising a small droplet 112 of a liquid, such as water, typically (but not necessarily) with a diameter from several micrometers to several millimeters. Droplet 112 is disposed on a substrate 114. Substrate 114 is typically hydrophobic or has a hydrophobic coating. Depending on the application, the liquid and substrate might only be transparent to light having wavelengths within a selected range. A beam of light 116 impinging onto microlens 100 is focused at a focal point 118 that is a focal length "$f$" away from the contact plane between droplet 112 and substrate 114.

The contact angle "$\theta$" between droplet 112 and substrate 114 is determined by interfacial tension forces (or the interfacial energy associated with these forces) characterized by surface tension coefficients "$\gamma$", typically measured in milli-Newtons per meter (mN/m). As used herein, $\gamma_{S-V}$ is the surface tension coefficient between substrate 114 and the air, gas, or liquid (hereafter referred to as "vapor") that surrounds microlens 100; $\gamma_{L-V}$ is the surface tension coefficient between droplet 112 and the vapor, and $\gamma_{S-L}$ is the surface tension coefficient between substrate 114 and droplet 112. Then angle $\theta$ may be determined using Equation (1):

$$\cos\theta = \frac{\gamma_{S-V} - \gamma_{S-L}}{\gamma_{L-V}} \qquad (1)$$

Angle $\theta$ and the volume of droplet 112 (Volume) determine the radius (R) of surface curvature of droplet 112 according to Equation (2) as follows:

$$R^3 = \frac{3 Volume}{\pi(1 - \cos\theta)(2 - \cos^2\theta - \cos\theta)} \qquad (2)$$

The focal length $f$ of droplet 112 is a function of R and the refractive indices, $n_L$ and $n_V$, of droplet 112 and the vapor, respectively. Said focal length $f$ may be calculated using Equation (3):

$$f = R/(n_L - n_V) \qquad (3)$$

Since substrate 114 has little effect on the focal length of microlens 100 (due to the substrate's substantially planar geometry), Equation (3) may also be used to calculate the focal length of microlens 100. As is clear from Equations (2) and (3), the focal length of microlens 100 is a function of $\theta$.

Figure 2:
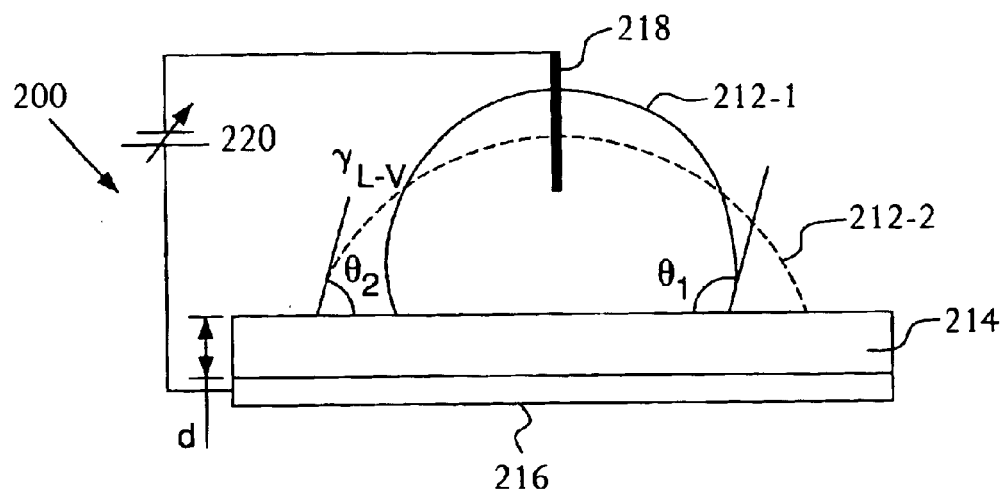
FIG. 2 illustrates the electrowetting phenomenon.

FIG. 2 demonstrates how the electrowetting phenomenon may be used to reversibly change angle $\theta$ and, therefore, the focal length of a liquid microlens. FIG. 2 shows a tunable liquid microlens 200 comprising a droplet 212 of a conducting liquid disposed on an insulating layer 214, which layer has a thickness "d" and dielectric constant "$\epsilon_r$". Microlens 200 further comprises (i) an electrode 216 positioned below layer 214 and insulated from droplet 212 by said layer and (ii) an electrode 218 immersed into droplet 212. Electrodes 216 and 218 are connected to a variable voltage source 220. Droplet 212, substrate 214, and electrodes 216 and 218 may be, for example, a water droplet, a teflon/parylene slide, a copper film, and a platinum wire, respectively.

When no voltage difference is applied to electrodes 216 and 218, droplet 212 maintains the shape shown by solid line 212-1 in FIG. 2. Shape 212-1 is defined by the volume of droplet 212 and contact angle $\theta_1$, where $\theta_1$, in turn, is determined by the surface tension coefficients as explained above. The shape shown by dashed line 212-2 illustrates that droplet 212 spreads over layer 214 when a voltage "V" is applied by source 220 to electrodes 216 and 218. Depending on the thickness of layer 214 and the materials involved, the applied voltage may range from several volts to several hundred volts. In the example shown in FIG. 2, the value of $\theta$ decreases from $\theta_1$ to $\theta_2$. The degree of spreading (e.g., characterized by the contact angle) is a function of V (i.e., $\theta(V)$) and can be calculated using Equation (4):

$$\cos\theta(V) = \cos\theta(V=0) + \frac{\varepsilon_0 \varepsilon_r}{2d\gamma_{L-V}} V^2 \qquad (4)$$

where $\theta(V=0)$ is the contact angle between layer 214 and droplet 212 when no voltage is applied between electrodes 216 and 218 (i.e., $\theta_1$) and $\epsilon_0 = 8.85 \times 10^{-12}$ F/m is the permittivity of vacuum. It is clear from Equation (4) that the degree of spreading depends on the absolute value of V and does not depend on the polarity.

Tunable Liquid Microlens

Figure 3A:
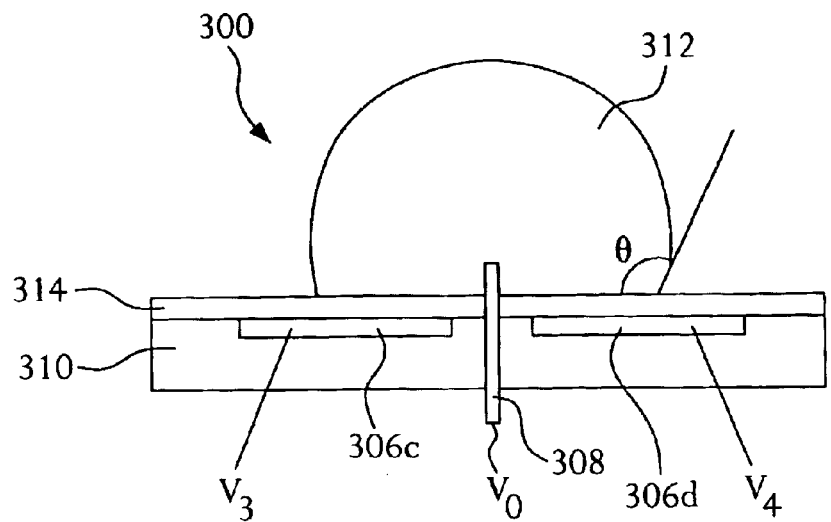
FIGS. 3A–B show a side and top view of a tunable liquid microlens according to one embodiment of the present invention.
Figure 3B:
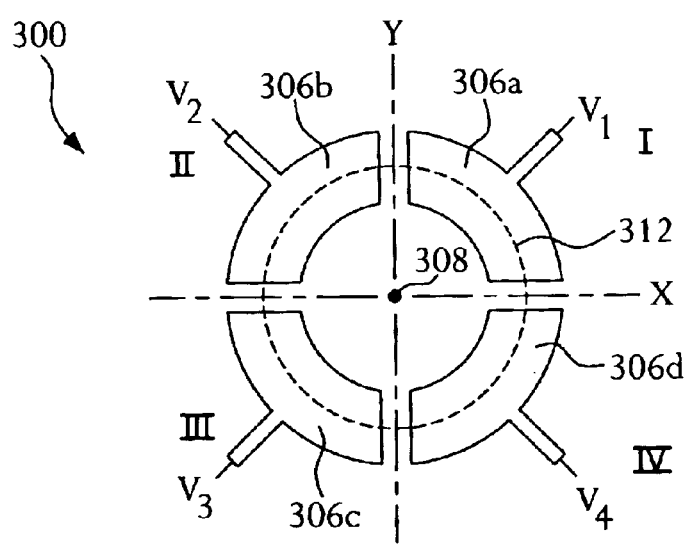

FIGS. 3A and 3B show side and top views, respectively, of a tunable liquid microlens 300 according to one embodiment of the present invention. Microlens 300 comprises a droplet 312 of a conductive liquid disposed on a first surface of a dielectric insulating layer 314. In one embodiment, layer 314 may be, for example, a polyimide layer coated with a fluorinated polymer (e.g., a highly fluorinated hydrocarbon). Layer 314 preferably provides a desired value of the contact angle, low contact angle hysteresis, and has a dielectric breakdown strength appropriate for the intended application of voltages.

Microlens 300 further comprises a plurality of electrodes 306, e.g., electrodes 306a–306d, and a droplet electrode 308. Electrodes 306 are electrically insulated from droplet 312 by layer 314, whereas electrode 308 is in contact with droplet 312. In one embodiment, electrodes 306 may be deposited onto a second surface of layer 314. Each electrode 306 and 308 is coupled to a variable voltage source (not shown) configured to apply respective voltages $V_1$–$V_4$ and $V_0$ to said electrodes. Microlens 300 may also include an optional supporting substrate 310 configured to support electrodes 306 and layer 314.

FIG. 3B illustrates an exemplary configuration for electrodes 306 according to one embodiment of the present invention. In the embodiment shown in FIG. 3B, four electrodes 306a–306d are used. In different embodiments, a different number, as well as pattern and/or shape, of electrodes 306 and 308 may be utilized in microlens 300. Furthermore, in one embodiment, electrodes 306 and 308 and substrate 310 may be, for example, gold, platinum, and glass, respectively. In other embodiments, other suitable materials may be used. Additional embodiments for a tunable liquid microlens are disclosed in related U.S. patent application Ser. No. 09/884,605, filed Jun. 19, 2001, and entitled "Tunable Liquid Microlens."

Figure 4A:
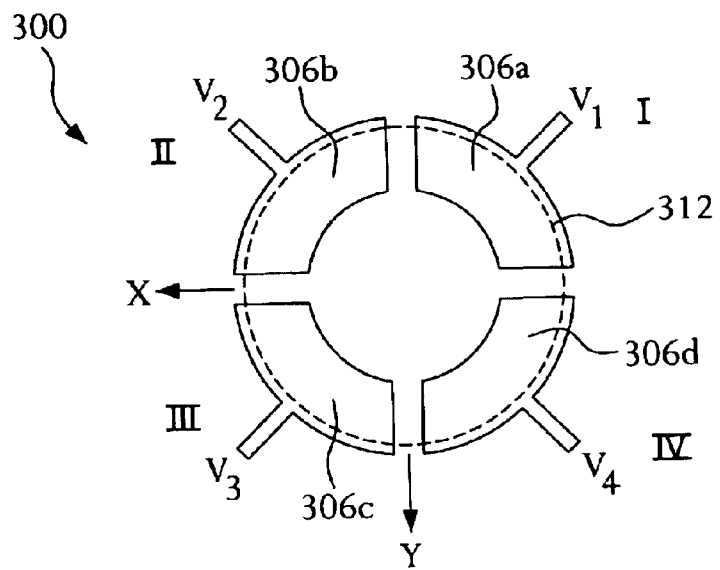
FIGS. 4A–B illustrate exemplary shape changes of the tunable liquid microlens of FIG. 3 due to the biasing of the electrodes.
Figure 4B:
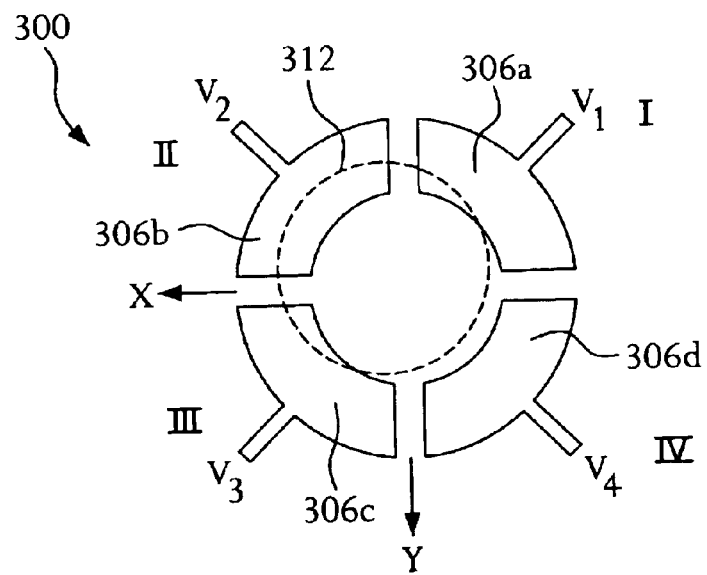

FIGS. 4A and 4B illustrate how the shape and/or position of droplet 312 of microlens 300 can be changed (tuned) using biasing of electrodes 306 and 308. When no or equal voltages (i.e., $V_1=V_2=V_3=V_4$ are applied to electrodes 306 and 308, droplet 312 is centered relative to electrodes 306, e.g., as shown in FIG. 3B. As explained above, the volume of droplet 312 and contact angle $\theta$ determine the droplet's shape in accordance with Equations (1)–(3). Referring now to FIG. 4A, if equal voltages are applied to electrodes 306 and a different voltage is applied to electrode 308 (i.e., $V_1=V_2=V_3=V_4 \neq V_0$), then droplet 312 spreads equally within quadrants I–IV as shown by the dashed line in FIG. 4A. In so doing, the value of angle $\theta$ is reduced whereas the focal length of microlens 300 is increased.

FIG. 4B illustrates that the lateral position of droplet 312 along the X- and Y-axes can be changed (tuned) using differential biasing of electrodes 306 and 308. For example, by applying the following exemplary pattern of voltages: $V_1=V_3=V_0<V_4<V_2$, droplet 312 is moved toward the higher voltage electrode 306b in quadrant II as shown by the dashed line in FIG. 4B. By applying a different pattern of voltages to the electrodes, droplet 312 can be steered to different positions and/or shapes within quadrants I–IV. Change in the position of droplet 312 results in a corresponding movement of the focal point of microlens 300.

It should be apparent from the above examples that one can change any one of or both the contact angle and position of droplet 312 by applying various combinations of voltages to electrodes 306 and 308. Therefore, microlens 300 is tunable such that its focal point can move in three dimensions, i.e., along the Z-axis by changing the contact angle (and therefore the focal length) and along the X- and Y-axes by laterally steering the droplet within quadrants I–IV.

Figure 5:
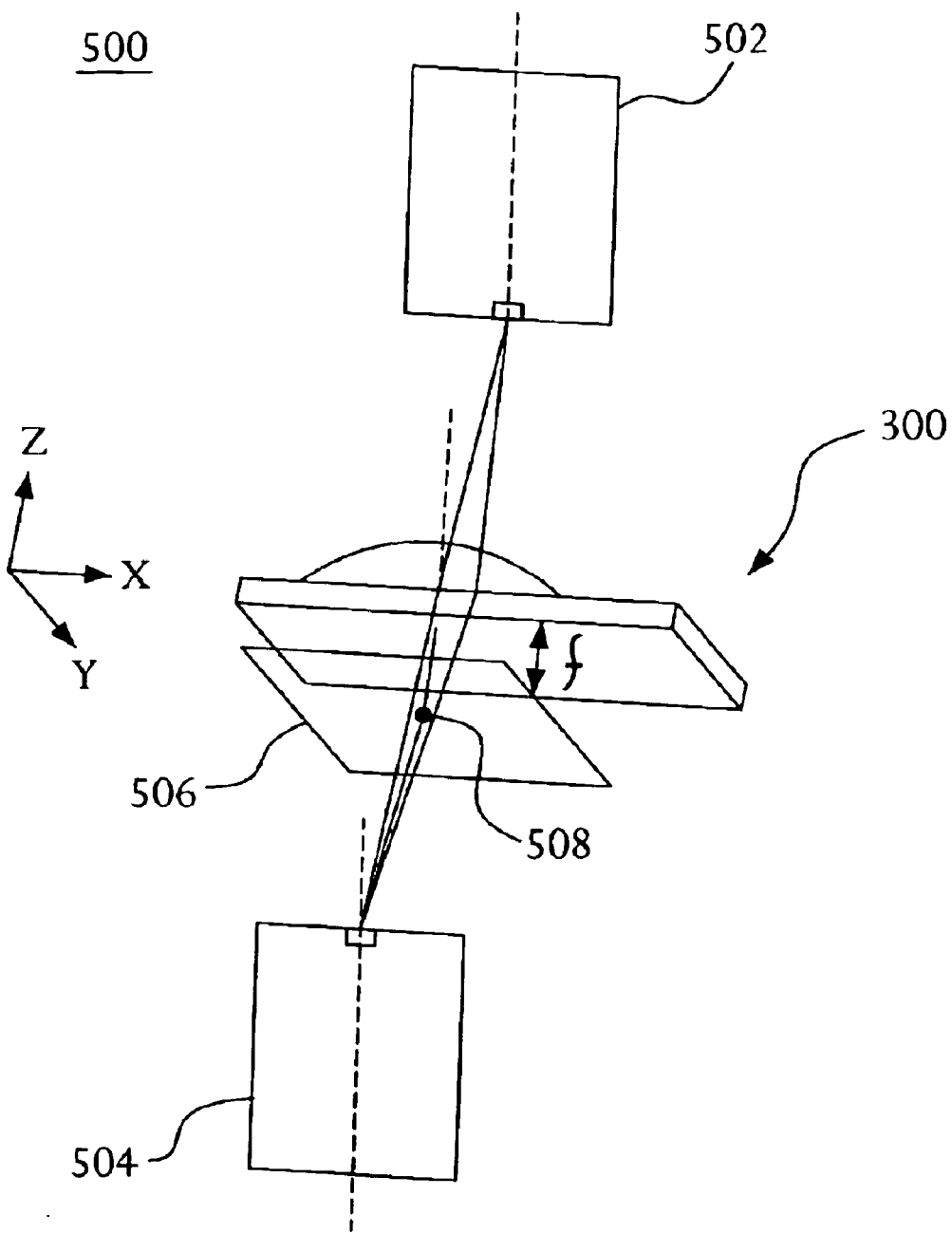
FIG. 5 illustrates an exemplary optical system, in which a microlens of the present invention may be used.

FIG. 5 illustrates an exemplary optical system 500, in which microlens 300 may be used. In addition to microlens 300, system 500 comprises an optical signal transmitter 502 and an optical signal receiver 504. In one embodiment, transmitter 502 and receiver 504 may be a laser and photodetector, respectively. Microlens 300 is configured between transmitter 502 and receiver 504 to achieve optimal optical coupling between the two. In the example shown in FIG. 5, a beam of light emitted from transmitter 502 is diverging and, as such, will be focused behind focal plane 506 of microlens 300. To obtain optimal coupling, focal point 508 of microlens 300 is moved along the X-, Y-, and/or Z-axes as described above, e.g., by selectively biasing the electrodes of microlens 300 until maximum power is detected at receiver 504.

Using a tunable microlens, such as microlens 300, in an optical device that requires alignment may be advantageous compared to other alignment/tuning techniques. For example, one commonly used method of alignment is to physically move optical components until optimal coupling is achieved. This method may be slow and expensive as it involves manual labor of a qualified technician. By including one or more tunable liquid microlenses of the present invention into an optical device that needs to be aligned, the amount of such labor may be significantly reduced or, in some instances, eliminated.

One of ordinary skill in the art will realize that tunable microlenses, such as microlens 300, may be utilized in various optical and/or optoelectronic applications. However, in many such applications, it is preferable to maintain an optimal configuration for a long period of time or, quite often, for the entire application life of the device. In such cases, it may be advantageous to "disable" the tunability feature of a tunable microlens after the optimal configuration for the device has been obtained.

A desired configuration of microlens 300 can be fixed, e.g., by maintaining the voltages applied to electrodes 306 and 308. However, in some applications, it may not be feasible to incorporate a suitable voltage source to maintain the voltages, e.g., due to size constraints. Therefore, other approaches to fixing different configurations of a tunable microlens are desirable. Embodiments of the present invention described hereafter are directed, e.g., to a method of fixing a configuration of a tunable liquid microlens, such as microlens 300, without continuous application of voltages.

Solidifiable Tunable Liquid Microlens

Different conductive liquids may be used in a tunable liquid microlens, such as microlens 300. In one embodiment, droplet 312 of microlens 300 may be an inherently conductive liquid, such as organic molten salts (e.g., 1-ethyl-3-methyl-1H imidazolium tetrafluoroborate or 1-ethyl 3-methyl-1H-imi trifluoromethanesulfonate). In a different embodiment, the liquid of droplet 312 may be made conductive, e.g., through the use of various additives. Typical examples of the latter liquids are aqueous solutions of inorganic salts (e.g., $K_2SO_4$, NaCl, $KClO_4$, etc.) or organic solutions of (i) organic molten salts (e.g., those given above) or (ii) other soluble organic salts (e.g., tetralkylammonium salts of various acids, such as toluenesulfonic acid, fluorinated aliphatic or aromatic acids, etc.). Other examples of usable liquids can be found in related U.S. patent application Nos. 09/884,605, filed Jun. 19, 2001, and 09/951,637, filed Sep. 13, 2001.

In general, liquids used in tunable microlenses may remain liquid throughout the life of the lens. Therefore, a droplet (e.g., droplet 212 of microlens 200 of FIG. 2) will typically revert to its initial shape (e.g., shape 212-1) once the voltage source (e.g., source 220) is disconnected. According to the embodiments of the present invention described hereafter, a tunable liquid microlens, e.g., microlens 300, can be configured to fix its configuration (e.g., a focal length and/or lateral position of droplet 312) using solidifiable liquids.

In one embodiment of the present invention, droplet 312 of microlens 300 comprises a photopolymerizable liquid. Such liquid can be obtained, e.g., by mixing a Norland Optical Adhesive "NOA-61" (manufactured and distributed by Norland Products Inc. of Cranbury, N.J.) with 0.01 wt. % of molten salt (e.g., 1-ethyl-3-methyl-1H imidazolium tetrafluoroborate, available from Sigma-Aldrich Corporation of St. Louis, Mo.). Different suitable optically curable liquids optionally mixed with different conductive additives in different proportions may also be used in droplet 312 of microlens 300. In a preferred embodiment, such optically curable liquid transmits light within a selected range of wavelengths in both the liquid and solidified form.

For example, in one embodiment of the present invention, an optically curable liquid may be obtained using a liquid epoxy monomer (or a mixture of such monomers) and an "onium salt" photo-acid generator. Epoxy monomers may be chosen such that they can undergo acid-catalyzed polymerization. The onium salt confers electrical conductivity to the liquid and serves as an initiator for the polymerization. In another embodiment, an optically curable liquid may comprise a vinyl monomer (or a mixture of such monomers) and a corresponding initiator. The onium salt may serve as an initiator for vinyl polymerization because it also facilitates free radical formation. Therefore, mixtures of epoxy and vinyl monomers may be co-polymerized using the dual (acid and free radical) initiating action of the onium salt. A programmed temperature treatment may be used to enhance the degree of polymerization (which is advantageous for long-term material stability) after a desirable shape of the microlens has been fixed by initial solidification.

Figure 6:
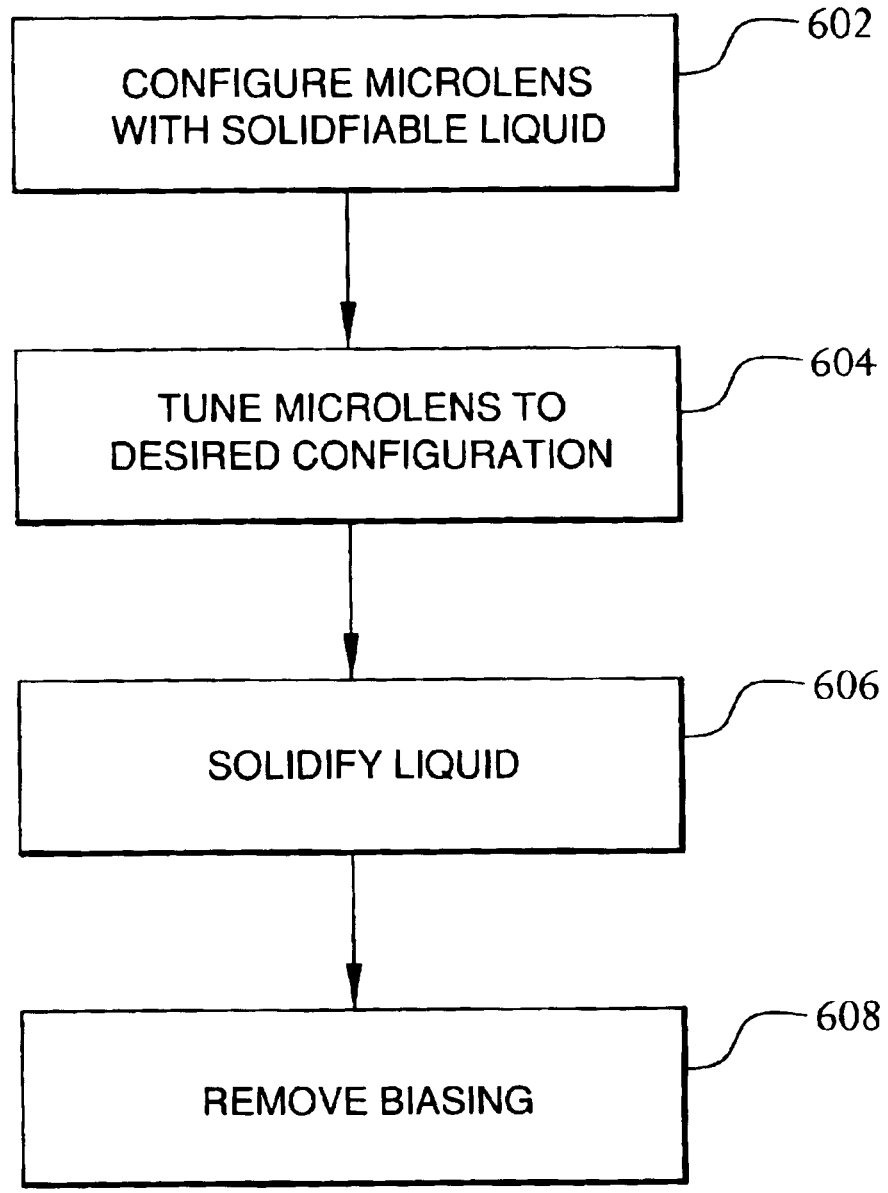
FIG. 6 shows a method that may be used for fixing a desired configuration of a tunable microlens of the present invention.

FIG. 6 shows an exemplary method 600 that may be used to fix a configuration of a tunable liquid microlens, e.g., microlens 300, according to one embodiment of the present invention. In step 602 of method 600, microlens 300 is configured with droplet 312 of a solidifiable liquid, e.g., an NOA-61/molten salt mixture. In step 604, microlens 300 is tuned to a desired configuration, e.g., using the voltages applied to electrodes 306 and 308. If microlens 300 is part of an optical device, such as system 500 of FIG. 5, step 604 may be performed by interactively monitoring the performance of that optical device, e.g., the coupling efficiency between transmitter 502 and receiver 504. In step 606, the desired configuration of the microlens is fixed by solidifying the liquid in droplet 312. In one implementation in which microlens 300 is configured with the mentioned NOA-61/ molten salt mixture, step 606 may be accomplished by subjecting droplet 312 to UV radiation, e.g., the 365-nm spectral line of a mercury lamp. In other implementations, different stimuli may be applied to droplet 312 to solidify it. After droplet 312 has been solidified, the voltages are removed from electrodes 306 and 308 in step 608 and microlens 300 may be used as a regular solid lens.

Depending on the particular liquid used in droplet 312, the stimulus applied to the droplet in step 606 of method 600 may be one or more of the following: (1) change of temperature (heating and/or cooling); (2) electromagnetic radiation (e.g., microwave, UV, or IR); (3) corpuscular radiation (e.g., β- or neutron); and/or (4) time. For example in one embodiment, the material of droplet 312 may be such that it undergoes a liquid-to-solid phase transition in a suitable temperature range. Then steps 602 and 604 of method 600 may be performed at an elevated temperature, while step 606 is accomplished by dropping the temperature to below the phase transition point to solidify droplet 312. In a different embodiment, the material of droplet 312 may be a relatively slow-curing epoxy resin. Then steps 602 and 604 of method 600 may be performed while the resin is in a liquid state, while step 606 is accomplished by simply waiting a sufficient amount of time for the resin to polymerize.

In addition, the solidification of droplet 312 carried in step 606 of method 600 does not need to be complete or uniform. For example in one embodiment, only the periphery of droplet 312 is solidified to form a shell-like enclosure for the inner regions of the droplet, which regions may include a fluid. In other embodiments, after step 606, the material of droplet 312 may have the consistency of a gel.

In some embodiments of the present invention, droplet 312 may change its volume, e.g., shrink by about 10–20%, during step 606 of method 600. To compensate for the shrinkage, step 604 of method 600 may further include a step of offsetting the voltages applied to electrodes 306 and 308 by appropriate values. In a preferred implementation, the offset values are chosen in such a manner as to have the resulting configuration of microlens 300 (e.g., the focal length and/or lateral position of droplet 312 after the shrinkage in step 606) to correspond to the desired configuration.

Furthermore, the voltages at electrodes 306 and/or 308 need not be kept constant during step 606 of method 600. For example, one or more voltages may be changed during step 606. Alternatively, step 608 may be performed after partially solidifying the liquid in step 606. Then step 606 may be carried out to completion.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method of making a lens, comprising the steps of:
   (A) tuning a droplet comprising a solidifiable liquid on a substrate to a desired configuration, wherein the tuning includes:
   biasing of two or more electrodes insulated from said droplet and adapted to control the position of said droplet; and
   controlling the position of said droplet, the position of said droplet being variable; and
   (B) at least partially solidifying the liquid.

2. The method of claim 1, wherein the tuning further includes biasing of the two or more electrodes with respect to an electrode, which is in contact with said droplet.

3. The method of claim 2, wherein said at least partially solidifying step comprises the step of changing one or more biasing voltages applied to the electrodes.

4. The method of claim 3, wherein said at least partially solidifying step comprises the step of removing the biasing voltages.

5. The method of claim 1, wherein said at least partially solidifying step comprises the step of fully solidifying the liquid.

6. The method of claim 5, wherein said at least partially solidifying step comprises the step of solidifying a peripheral portion of the droplet to form an enclosure for inner portions of said droplet.

7. The method of claim 5, wherein said at least partially solidifying step comprises the step of solidifying the liquid to the consistency of a gel.

8. The method of claim 1, wherein said at least partially solidifying step is performed by applying a stimulus to the droplet.

9. The method of claim 8, wherein the stimulus comprises at least one of a temperature change, electromagnetic radiation, and corpuscular radiation.

10. The method of claim 8, wherein:
    for said tuning step, the solidifiable liquid comprises a mixture of a photopolymerizable liquid and molten salt; and
    for said at least partially solidifying step, the stimulus is ultra-violet radiation.

11. The method of claim 1, wherein said at least partially solidifying step is performed by waiting a period of time.

12. The method of claim 1, wherein said tuning step comprises the steps of:
    changing the surface curvature of the droplet; and
    moving the droplet along the substrate.

13. The method of claim 1, wherein said tuning step comprises the step of offsetting one or more biasing voltages applied to the one or more electrodes to compensate for a volume change of the droplet during said at least partially solidifying step.

14. The method of claim 1, wherein the lens is part of an optical device comprising two or more optical components and said tuning step comprises the step of optimizing optical coupling between said two or more optical components.

15. The method of claim 1, wherein said tuning step comprises (i) biasing four electrodes configured underneath the substrate and (ii) biasing an electrode in contact with the droplet, wherein:
    the substrate is an insulating substrate; and
    each electrode is connected to a voltage source configured to independently apply different voltages to each electrode.

16. An apparatus for making a lens, comprising:
    (A) means for tuning a droplet comprising a solidifiable liquid on a substrate to a desired configuration; wherein the means for tuning includes:
    means for biasing of two or more electrodes insulated from said droplet and adapted to control the position of said droplet; and means for controlling the position of said droplet, the position of said droplet being variable; and (B) means for at least partially solidifying the liquid.

17. The method of claim 1, wherein the tuning further includes biasing of the electrodes to control the shape of said droplet.

18. The method of claim 1, wherein change in the position of said droplet results directly from electrostatic attraction between said droplet and the electrodes.

19. The apparatus of claim 16, wherein change in the position of said droplet results directly from electrostatic attraction between said droplet and the electrodes.

20. A method of making a lens, comprising the steps of:
(A) tuning a droplet comprising a solidiflable liquid on a substrate to a desired configuration, wherein the tuning includes:
  biasing of one or more electrodes insulated from said droplet and adapted to control the position of said droplet; and
  controlling the position of said droplet, the position of said droplet being variable, wherein change in the position of said droplet results directly from electrostatic attraction between said droplet and at least one of the one or more electrodes; and
(B) at least partially solidifying the liquid.

* * * * *